United States Patent
Boulant (10) Patent No.: US 7,810,454 B2
(45) Date of Patent: Oct. 12, 2010

(54) ANIMAL BREEDING PLANT

(76) Inventor: Alain Christian Michel Guy Boulant, 13, avenue des Pins, Sainte-Marguerite, F-44380 Pornichet (FR)

( * ) Notice: Subject to any disclaimer, the term of this patent is extended or adjusted under 35 U.S.C. 154(b) by 140 days.

(21) Appl. No.: 11/921,033

(22) PCT Filed: May 30, 2006

(86) PCT No.: PCT/FR2006/001227

§ 371 (c)(1), (2), (4) Date: Nov. 26, 2007

(87) PCT Pub. No.: WO2006/129009

PCT Pub. Date: Dec. 7, 2006

(65) Prior Publication Data

US 2009/0101073 A1  Apr. 23, 2009

(30) Foreign Application Priority Data

Jun. 2, 2005 (FR) .................................. 05 05590

(51) Int. Cl.
*A01K 1/01* (2006.01)
(52) U.S. Cl. ............... 119/450; 119/447; 119/458; 119/161
(58) Field of Classification Search ............... 119/447, 119/450, 458, 161; 294/68.26, 68.27
See application file for complete search history.

(56) References Cited

U.S. PATENT DOCUMENTS

| 1,449,661 | A | * | 3/1923 | Forsythe | .................. 294/68.27 |
| 2,070,089 | A | * | 2/1937 | De Lacy-Mulhall | ......... 137/246 |
| 2,202,452 | A | * | 5/1940 | Hildabrand | ............... 73/170.23 |
| 2,798,758 | A | * | 7/1957 | Yakopec | .................. 294/68.26 |
| 2,823,061 | A | * | 2/1958 | Pottorf | .................... 294/68.27 |
| 3,308,840 | A | * | 3/1967 | Kelley | .................... 134/167 R |
| 6,083,386 | A | * | 7/2000 | Lloyd | ...................... 210/195.1 |
| 6,190,566 | B1 | * | 2/2001 | Kolber | ...................... 210/744 |
| 6,210,287 | B1 | * | 4/2001 | Briggs | ........................ 472/128 |
| 6,470,828 | B1 | * | 10/2002 | Townsend et al. | ........... 119/447 |
| 6,531,057 | B1 | * | 3/2003 | Houle | ........................ 210/104 |

FOREIGN PATENT DOCUMENTS

| DE | 1 193 301 B | | 5/1965 |
| DE | 1193301 B | * | 5/1965 |
| DE | 1 296 446 B | | 5/1969 |
| FR | 2650152 A | | 2/1991 |
| FR | 2781119 A | | 1/2000 |
| FR | 2781119 A | * | 1/2000 |

* cited by examiner

*Primary Examiner*—Timothy D Collins
*Assistant Examiner*—Justin Benedik
(74) *Attorney, Agent, or Firm*—Porzio, Bromberg & Newman, P.C.

(57) ABSTRACT

The inventive animal breeding plant comprises an animal stall area (1a-1f), means (11) for sharply flushing a cleaning fluid in said area in order to wash it and a channel which is used for recovering a mixture formed by said cleaning fluid and wastes flushed thereby and is arranged in front of said flushing means with respect to said area. The flushing means comprise at least one bucket (11) which is movably mounted between filling and flushing positions and whose shape is selected such that, when the filling level thereof with the cleaning fluid attains a predetermined threshold, the gravity center of the thus filled bucket (11) is shifted to such a point that the bucket (11) is tilted from said filling position to the flushing position in such a way that the fluid is sharply flushed in the area (1a-1f).

6 Claims, 9 Drawing Sheets

ANIMAL BREEDING PLANT

The present invention relates to an animal-rearing installation.

The indoor rearing of animals, and particularly of hogs, requires specific installations: specifically the wastes produced by these animals must be washed away regularly to allow them to grow in correct sanitary conditions.

Document FR 2 650 152 teaches of an animal-rearing installation, comprising an animal standing zone, means for violently flushing a cleaning fluid into said zone in order to wash this zone and, situated at the other end from said flushing means relative to said zone, a channel for collecting the mixture formed by said cleaning fluid and the wastes flushed by this fluid.

In this type of installation, the flushing of the cleaning fluid makes it possible to carry away the wastes accumulated in the animal standing zone.

The cleaning fluid may be of various types: it may be water, or else wastes that have undergone a (biological and/or chemical and/or physical) treatment, or else a mixture of these two fluids.

If the animals are hogs, for example, slurry flushed from the standing zone may be collected in settlement tanks and it is then the liquid fraction of the decanted slurry that may be used to flush the standing zones.

In this type of installation, powerful pumping means must be used to obtain a flow making it possible to correctly wash the standing zones, which requires a considerable initial investment and, subsequently, is extremely costly in maintenance and consumption of electricity.

The main objectives of the present invention are to:
supply an animal-rearing installation that is not very costly to install and maintain,
limit the consumption of electricity,
limit the ammonia emissions in the buildings by reducing the time that fresh wastes remain in the animal standing zones,
limit the use of ventilation to extract the ammonia from the buildings, and the transfer of ammonia to the atmosphere, and
limit the health risks for the animals.

This object of the invention is achieved with an animal-rearing installation according to claim 1 attached hereto.

Thanks to the features of this installation, the bucket tips solely under the effect of the movement of its center of gravity during its filling, this tipping having the effect of sending a flow of cleaning fluid that is both very high and very violent into the animal standing zone, which makes it possible to flush a good proportion of the animal wastes that have fallen in this zone.

A weak flow of fluid is sufficient to fill the bucket, so that it is not necessary to use costly pumping means. The tipping of the bucket also requires no particular mechanism, so that the installation according to the invention is extremely simple and not very costly in initial investment, in maintenance and in consumption of electricity.

It is therefore possible to wash the animal standing zones simply, regularly and at low cost without having recourse to extraction of the ammonia to the atmosphere.

According to another optional feature of the installation according to the invention, said bucket comprises a trough arranged so that, when its level of filling with said cleaning fluid has reached a predetermined threshold, the center of gravity of the assembly formed by said substantially empty bucket and said trough thus filled moves to a point such that said bucket tips from said flushing position to said filling position, so as to refill with said cleaning fluid.

Thanks to this trough, it is possible to return the bucket to its initial position solely under the effect of the flow of cleaning fluid: here again, no specific actuation mechanism is necessary.

According to another optional feature of the invention, said bucket has a substantially asymmetric trapezoidal profile.

This trapezoidal shape is extremely simple to manufacture, and makes it easy to obtain the abovementioned function of moving the center of gravity gradually as the bucket fills.

According to other optional features of the installation according to the invention:
said trough has a bottom that is substantially horizontal when said bucket is in the filling position,
said trough comprises a bottom that is inclined relative to the horizontal when said bucket is in the filling position, this bottom comprising an emptying orifice allowing a leakage flow rate markedly less than the filling flow rate of said cleaning fluid,
said installation comprises trap means interposed between said pit and said channel,
said cleaning fluid originates at least partly from the recycling of the wastes flushed from said standing zone.

Other features and advantages of the present invention will appear in the light of the following description and on examination of the appended drawings in which.

Figure 1:
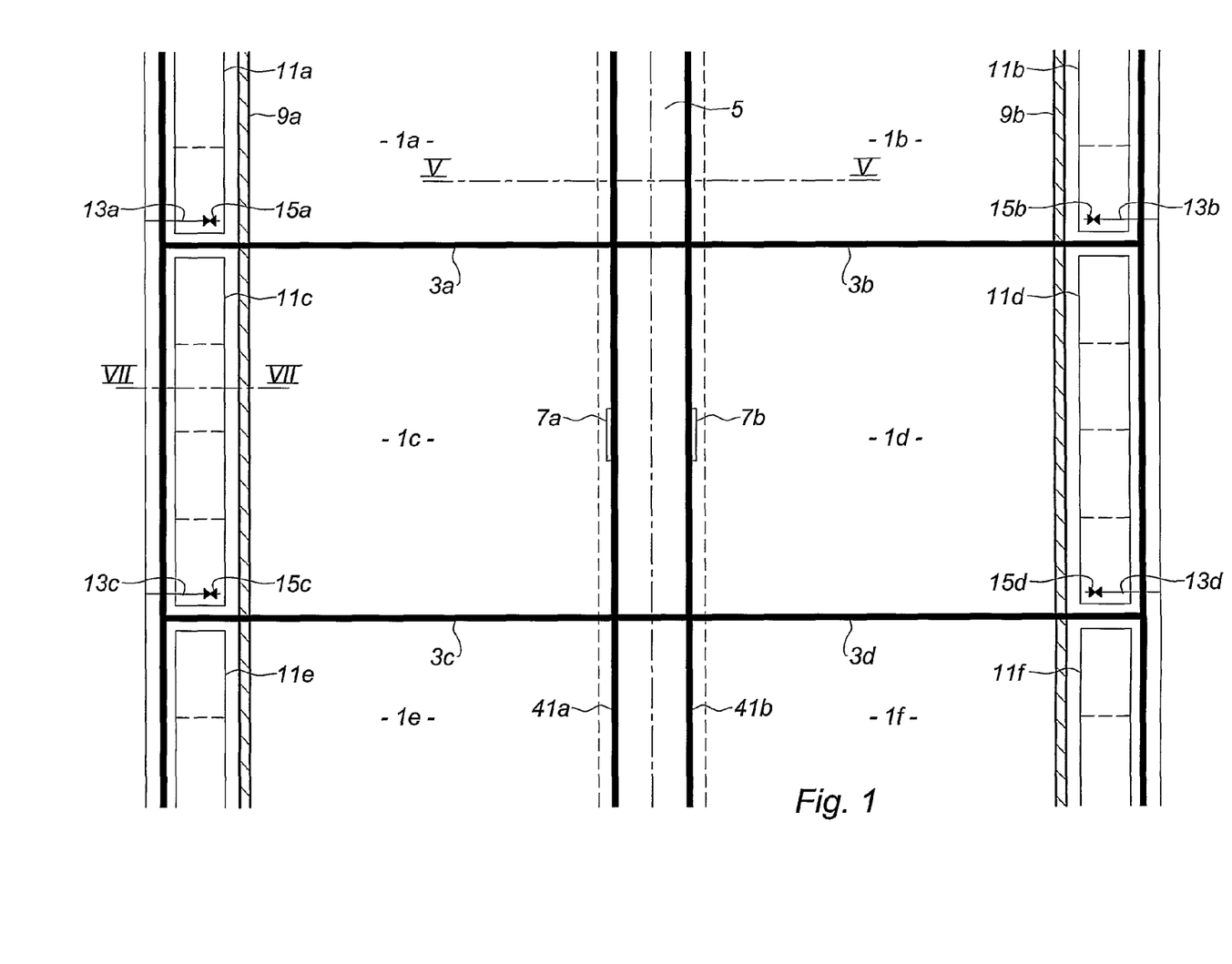
FIG. 1 represents a top schematic view of a livestock-rearing building fitted with an installation according to the invention.

Reference is now made to FIG. 1 in which it can be seen that the livestock-rearing building comprises a plurality of rooms 1a to 1f separated from one another by partitions 3a to 3d. A central corridor 5 runs in the middle of the building, thereby serving on the one hand the rooms 1a, 1c, 1e, and on the other hand the rooms 1b, 1d, 1f, thanks to the doors 7a, 7b placed in an appropriate manner.

Outside the bearing walls 9a, 9b of the building, and associated respectively with each of the rooms 1a to 1f, there are buckets 11a to 11f of elongated shape into which ducts 13a to 13d open, furnished at their ends with valves 15a to 15d.

As can be seen in FIG. 1, each bucket 11 may if necessary be subdivided into subsections.

Figure 2:
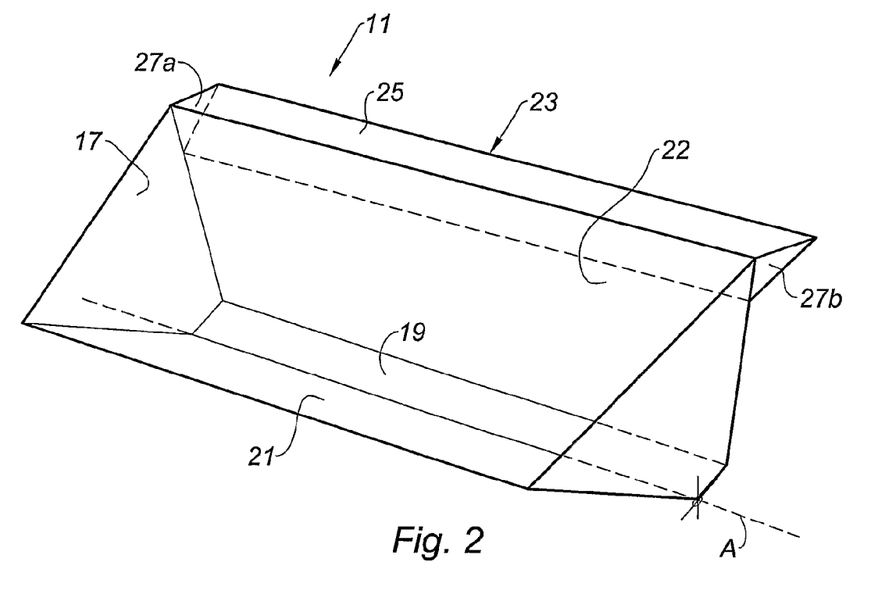
FIG. 2 represents a view in perspective of a bucket forming part of the installation according to the invention.
Figure 3:
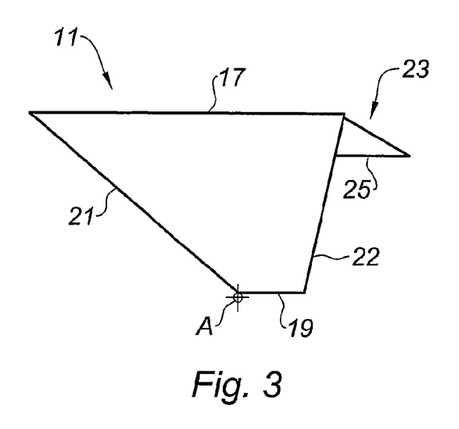
FIGS. 3 and 4 are side views of two variants of the bucket of FIG. 2.
Figure 4:
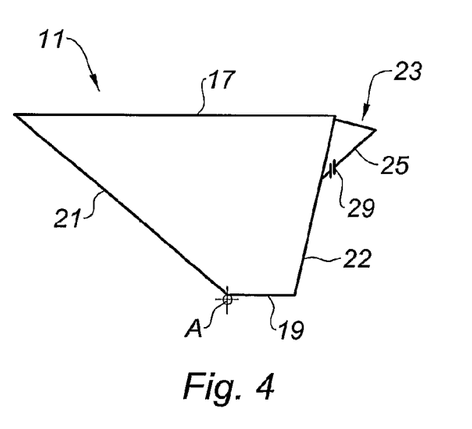

Reference is now made to FIGS. 2 to 4, in which it can be seen that each bucket preferably has a profile, that is to say a cross section at its greatest length, having substantially the shape of an asymmetric trapezium.

More precisely, the mouth 17 and the bottom 19 of the bucket are parallel with one another, the surface area of the mouth 17 being markedly greater than that of the bottom 19, and one wall 21 of the two inclined walls of the bucket has a surface area greater than the other wall 22.

The bucket 11 is mounted so as to pivot about an axis A situated in the vicinity of the ridge situated between the bottom 19 and the inclined wall 21.

Furthermore, the bucket 11 comprises, attached to the outside and in the upper portion of the inclined wall of lesser surface area 22, a trough 23 defined by a bottom 25 and two end panels 27a, 27b, this trough extending preferably over practically the whole length of the bucket 11.

In the variant represented in FIG. 3, the bottom 25 of the trough 23 is substantially parallel to the bottom 19 of the bucket 11, so that the bottom 25 of this trough is in the substantially horizontal position when the bucket 11 is in the position shown in FIG. 3.

In the variant shown in FIG. 4, the bottom 25 of the trough 23 is inclined relative to the bottom 19 of the bucket 11, so that the bottom 25 of the trough 23 is inclined relative to the horizontal when the bucket 11 is in the position shown in FIG. 4.

It will be noted that, in this second variant, the bottom 25 of the trough 23 is provided with an orifice 29 situated in the vicinity of the wall 22 of the bucket 11.

Figure 5:
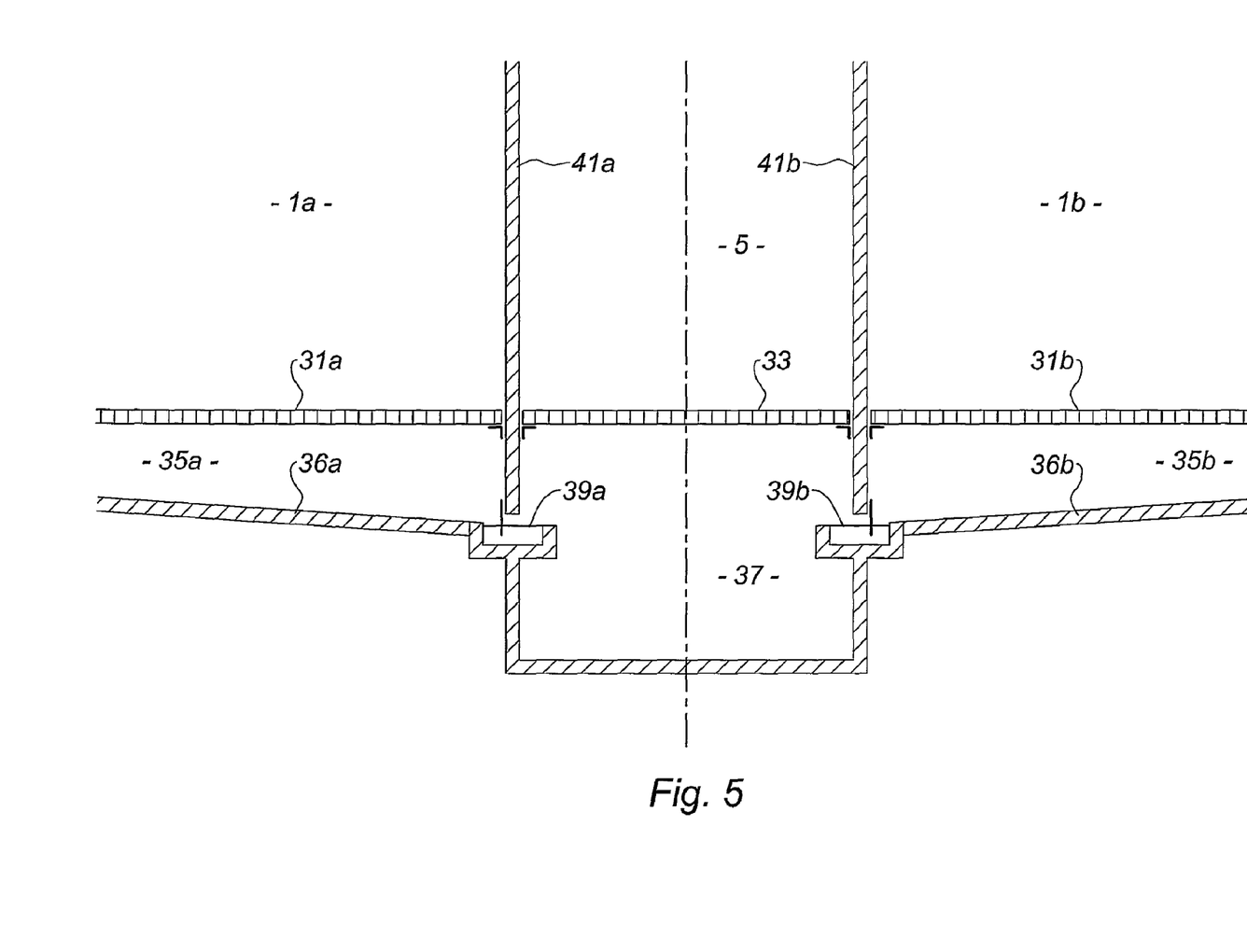
FIG. 5 is a view in section along the line V-V of the building shown in FIG. 1.

Reference is now made to FIG. 5 in which it can be seen that the floor of the livestock-rearing building comprises gratings 31a, 31b, 33 placed both in the rooms 1a, 1b and in the corridor 5.

Under the gratings 31a, 31b there are pits 35a, 35b whose bottom 36a, 36b, preferably made of concrete, has a slight slope (for example 1 cm per 1 m) in the direction of the corridor 5.

Beneath the grating 33 of the corridor 5 there is a channel 37 extending over the whole length of the corridor 5, and whose bottom is also preferably made of concrete.

Preferably, as is shown, trap devices 39a, 39b are placed in the zones where the pits 35a, 35b open into the channel 37, so as to prevent gaseous interchanges between the corridor 5 and these pits.

In the embodiment represented in FIG. 5, the trap devices 39a, 39b are formed by drainage trenches fixedly attached to the upper edges of the channel 37, in which the bottom ends of the partitions 41a, 41b separating the corridor 5 from the rooms 1a, 1b are partially submerged.

Figure 6:
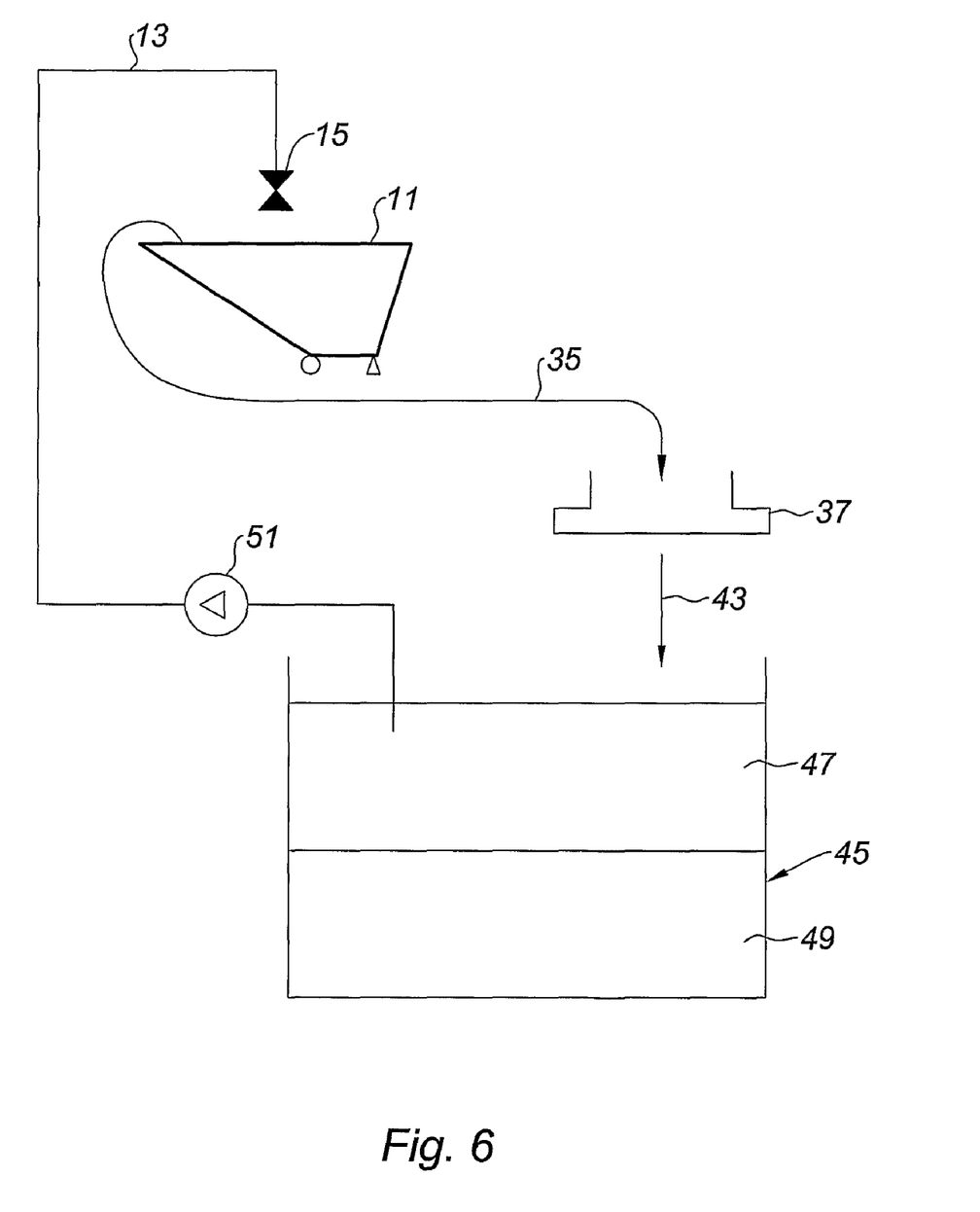
FIG. 6 represents schematically the fluid circuit of the installation according to the invention.

Reference is now made to FIG. 6 which shows a possible embodiment of the fluid circuit involved in the installation according to the invention.

As can be seen in this figure, each bucket 11 may be placed in fluid communication with the channel 37 by means of the associated pit 35.

Appropriate pipes 43 connect the outlet of the channel 37 to a recycling installation 45.

It should be understood that in the context of the present invention, the term "recycling" is a generic term that covers any method of treating the effluent collected at the outlet of the channel 37.

These treatment methods may be of the biological type (a bacteriological reactor for example), of the chemical type, or else of the physical type.

In the embodiment of FIG. 6, the recycling means 45 are of the physical type and in fact consist of a simple settlement tank in which the effluent is separated into two fractions: an upper liquid fraction 47 (consisting essentially of urine) and a lower solid fraction 49 (consisting essentially of fecal matter).

Low flow rate (typically of the order of 2 m$^3$ per hour) pumping means make it possible to send the liquid fraction 47 that is in the tank 45 into the pipes 13 that open into each trough 11.

Now to understand how the installation according to the invention operates, reference will be made below to FIGS. 7 to 11.

In these figures, a single bucket 11 has been shown, but it goes without saying that all the buckets of the installation operate according to the same principle as that which will be explained below.

Figure 7:
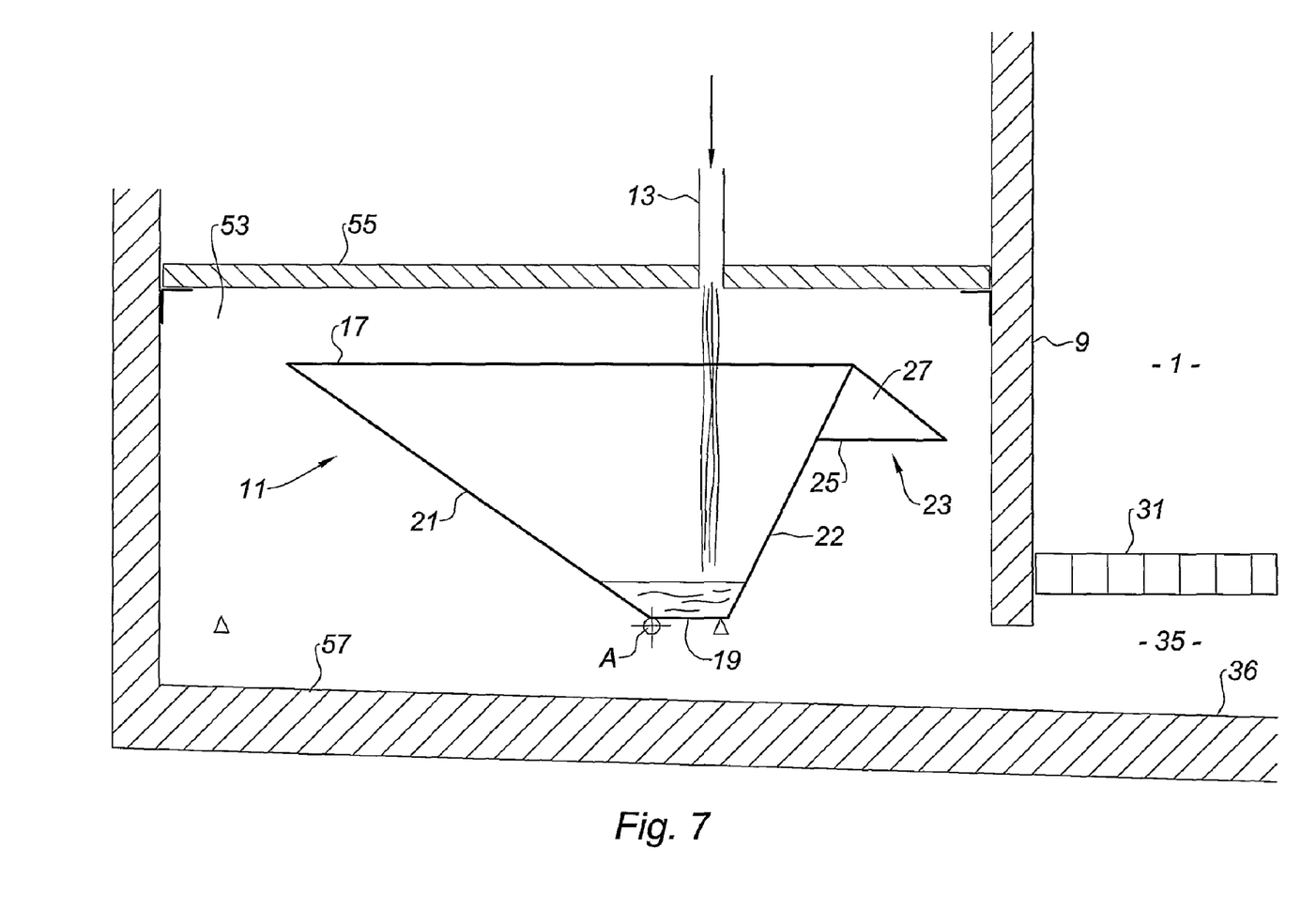
FIG. 7 is a view in section along the line VII-VII of the building shown in FIG. 1, in which a bucket of the installation according to the invention that is beginning to be filled with a cleaning fluid can be seen.

FIG. 7 shows that the bucket is situated in a place 53 adjacent to the room 1.

This place is preferably closed in its upper portion by a removable cover 55, and the bottom 57 of this place is situated in the extension of the bottom 36 of the pit 35, and has a slope at least equal to that of the latter.

It can be seen that the larger inclined wall 21 of the bucket 11 is preferably situated at the end away from the pit 35.

Beginning with the situation shown in FIG. 7, the bucket is in the position called "filling", that is to say in which the mouth 17 and the bottom 19 of this bucket are substantially horizontal.

The pump 51 is started and the valve 15 (see FIG. 6) is opened so that the fluid originating from the recycling device 45 flows from the duct 13 into the bucket 11 at a substantially constant flow rate.

Figure 8:
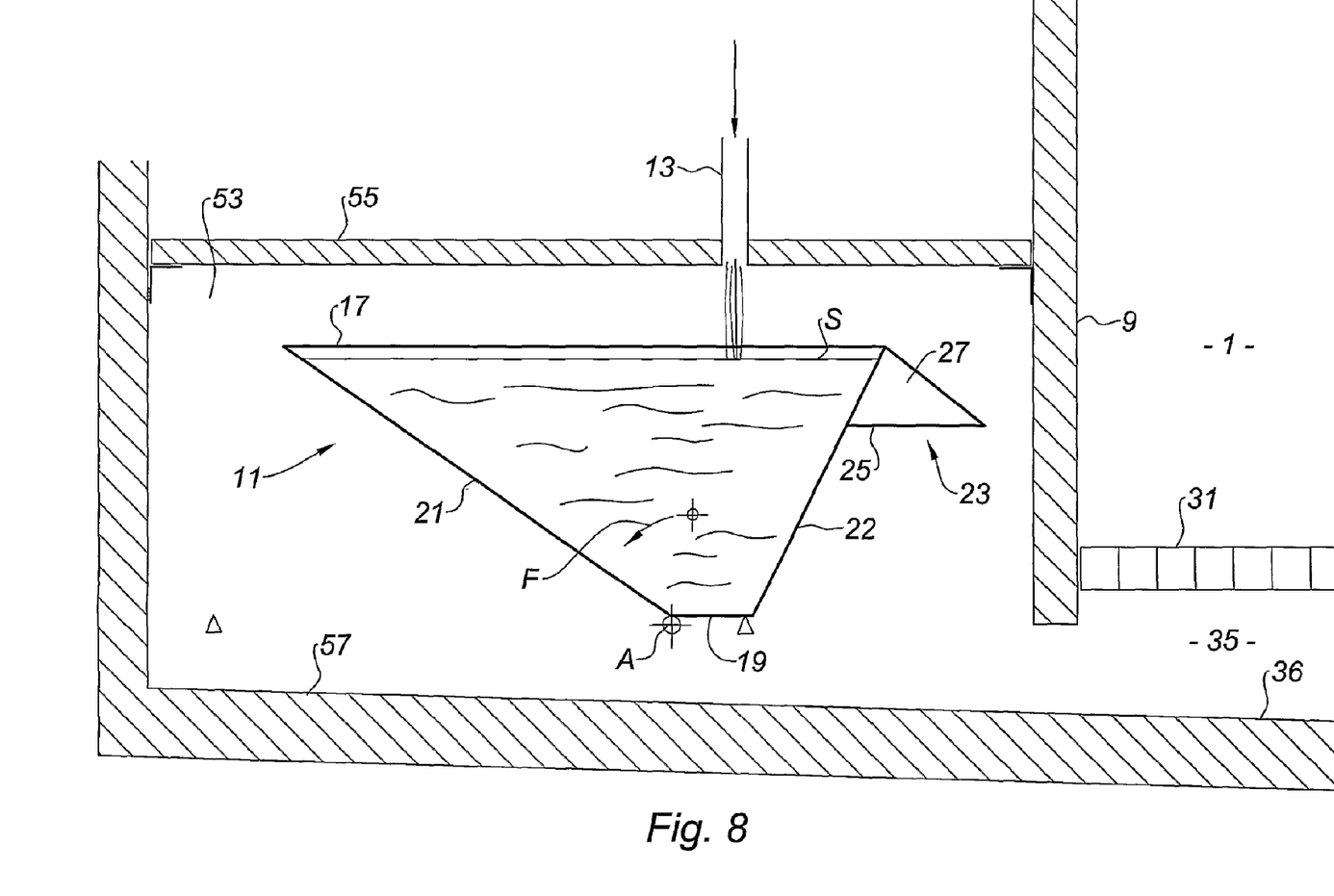
FIGS. 8 to 11 are similar to FIG. 7, the bucket being respectively in the following situations: end of filling with the cleaning fluid, tipping and flushing of the cleaning liquid, filling of the trough of the bucket, return of the bucket to the initial position.

As a result, the bucket 11 fills with fluid, which, because of the asymmetry of this bucket, tends to move the center of gravity of the assembly formed by this bucket and the fluid in the direction of the larger inclined wall 21, as is symbolized by the arrow F shown in FIG. 8.

Figure 9:
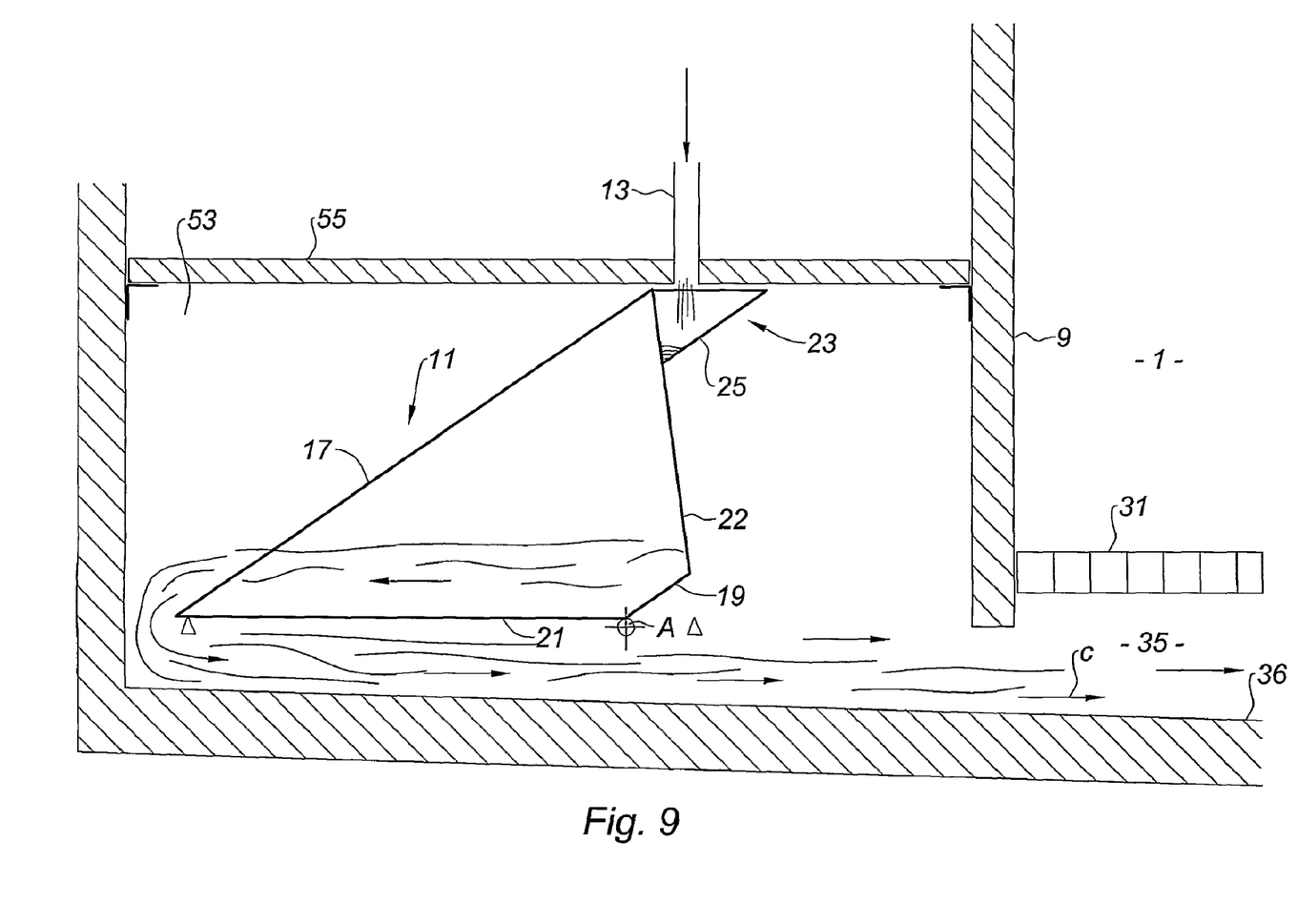

Therefore, when the filling level of fluid reaches a predetermined threshold S situated in the vicinity of the upper edge of this bucket, the bucket 11 tips violently about its pivoting axis A, as is shown in FIG. 9. This violent tipping has the effect of flushing the fluid situated inside the bucket 11 into the bottom 57 of the place 53 then into the bottom 36 of the pit 35, in the direction of the channel 37.

The flow rate of fluid thus flushed is extremely high, typically of the order of 35000 m$^3$ per hour for a bucket having a volume of the order of 9 m$^3$, suitable for a room 1 with a length (between the wall 9 and the channel 37) of approximately 20 m.

The fluid flush, symbolized by the arrows C of FIG. 9, has the effect of carrying away a large proportion of the waste situated in the bottom 36 of the pit 35, and originating from the animals standing on the grating 31.

This waste is therefore carried in the channel 37, then to the recycling device 45.

Figure 10:
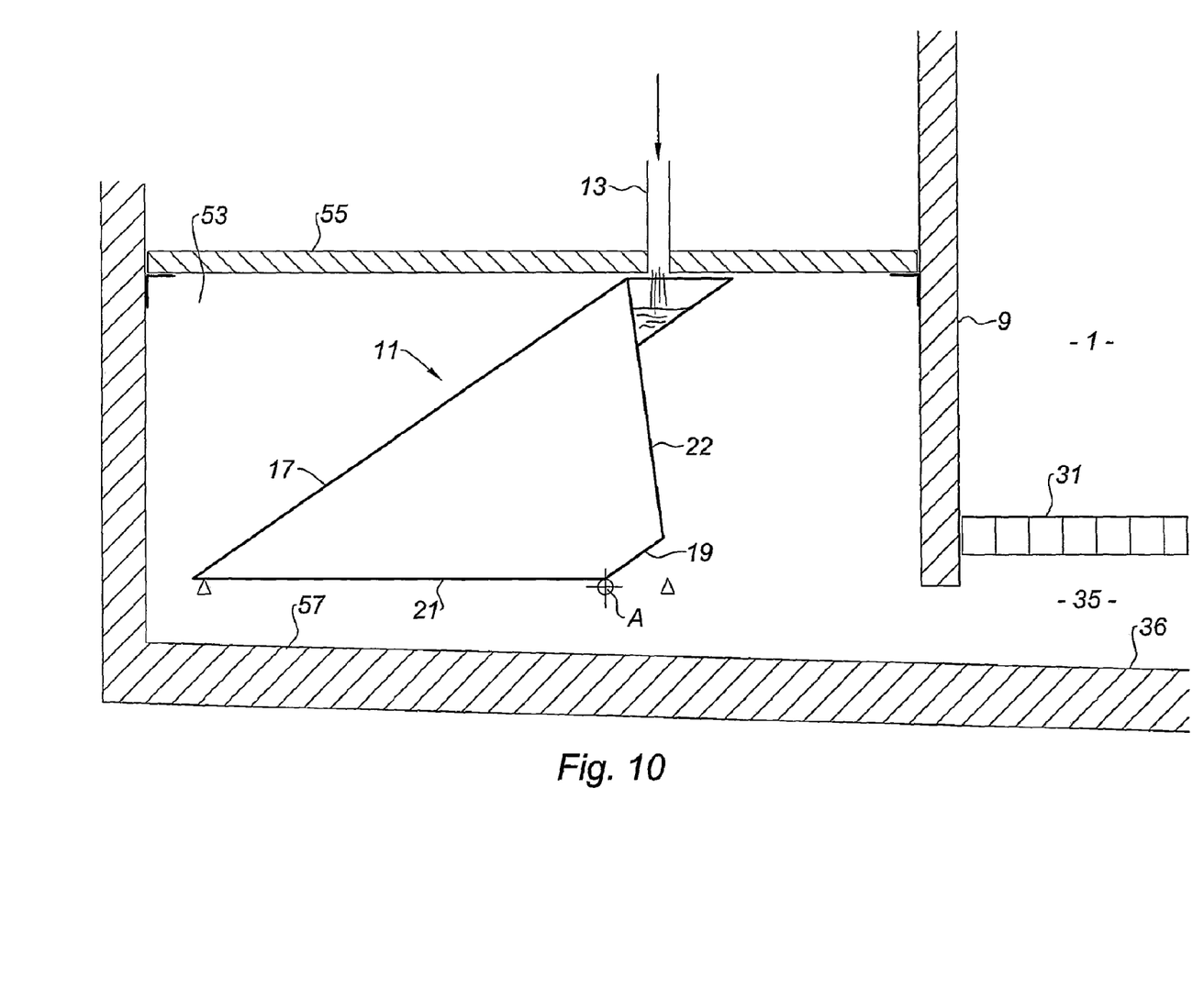

Once the bucket 11 has been tipped in the conditions described above, the trough 23 is in line with the pipe 13.

Figure 11:
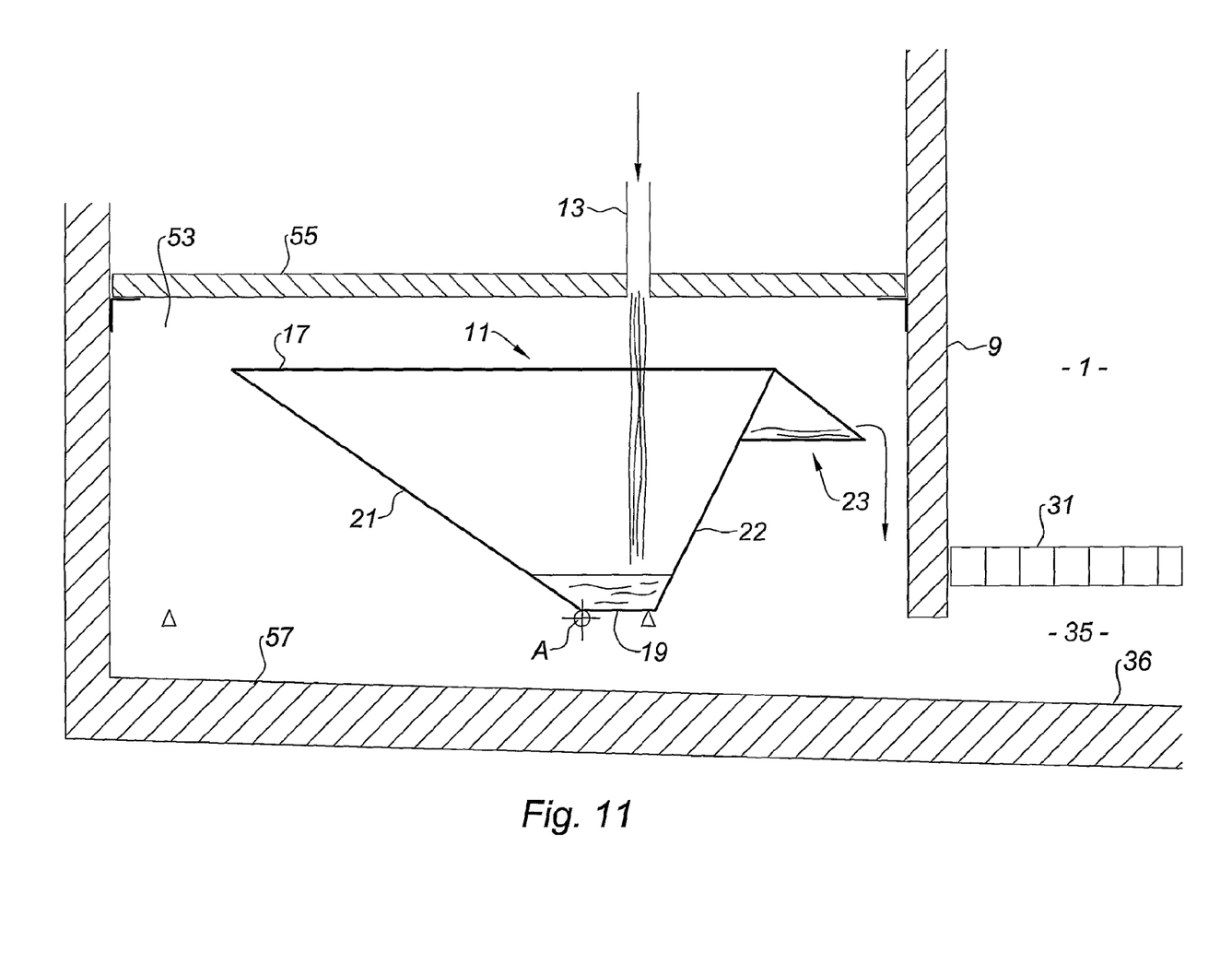

The fluid continuing to flow in this pipe progressively fills this trough until the moment when the weight of the fluid is sufficient to apply a torque to the empty bucket returning it to its initial filling position as shown in FIG. 11.

At the time of this return, the fluid that was inside the trough 23 is spilled (see arrow D in FIG. 11) into the bottom 57 of the place 53 then into the bottom 36 of the pit 35.

So long as the fluid is allowed to flow inside the pipe 13, the steps that have just been described are repeated in a cyclical manner.

For example, when the flow rate in the pipe 13 is of the order of 2 m$^3$ per hour and the volume of the bucket 11 is of the order of 9 m$^3$, the flush of fluid inside the pit 35 occurs approximately every four hours.

It will be noted that, if the trough 23 is according to the variant shown in FIG. 4, ascertain quantity of fluid remains in this trough until the end of the return movement of the bucket 11 to its initial position, which ensures that this movement can occur including in particular when the articulation of the bucket about its axis is seized up.

The orifice 29 provided in the bottom 25 of the trough 23 makes it possible, in this variant, to ensure that the trough ends by emptying completely while the bucket 11 fills.

As can be understood in the light of the foregoing, the installation according to the invention makes it possible to generate, at regular time intervals, a very high flow rate of cleaning fluid for a pit of a livestock-rearing building.

This high flow rate makes it possible to clear away a good portion of the animal wastes that accumulate in the bottom of the pit, and therefore reduce the ammonia emissions that are harmful to the animals and the bacterial risks.

It is no longer necessary to ventilate the livestock-rearing building to clear away the ammonia emissions, which makes it possible to keep the animals at a sufficiently high temperature (particularly in winter) without it being necessary to use heating means.

It will be noted for this reason that the trap means 39a, 39b shown in FIG. 5 make it possible to prevent the cool air situated in the corridor 5 from entering the rooms 1, thereby making it possible to keep the latter at a sufficiently high temperature for the animals.

The installation according to the present invention requires no expensive pumping means, and no particular actuation mechanism.

This installation, of very simple and very reliable design, is not very costly to install and maintain, and consumes relatively little electricity.

Naturally, the present invention is not limited to the embodiment described and shown, provided as an illustrative and nonlimiting example.

The invention claimed is:

1. An animal-rearing installation, comprising;
    an animal standing zone;
    flushing means for violently flushing a cleaning fluid into said zone in order to wash this zone, said flushing means being positioned upstream of said standing zone, and, situated at the other end from said flushing means relative to said zone;
    a channel for collecting the mixture formed by said cleaning fluid and the wastes flushed by this fluid, in which said flushing means include at least one bucket mounted so as to be movable between a filling position and a flushing position;
    said bucket including a bottom and two inclined walls extending from the bottom, a first one of said walls has a surface area greater than a second one of said walls, the asymmetric shape of this bucket being such that, when its level of filling with a cleaning fluid has reached a predetermined threshold, the center of gravity of this bucket thus filled is gradually moved to a pivoting point such that this bucket tips from said filling position to said flushing position in which said first one of said walls is placed in fluid communication with said zone, so as to violently flush said fluid into said zone in the direction of said first one of said walls;
    said bucket comprising a trough attached to an outside upper portion of the second one of said walls arranged so that, when the level of filling with said cleaning fluid has reached a predetermined threshold, the center of gravity of the assembly formed by said substantially empty bucket and said trough thus filled moves to a point such that said bucket tips from said flushing position to said filling position, so as to refill with said cleaning fluid;
    said trough being significantly smaller than said bucket.

2. The installation as claimed in claim 1, wherein said bucket has a substantially asymmetric trapezoidal profile.

3. The installation as claimed in claim 1, wherein said trough has a bottom that is substantially horizontal when said bucket is in the filling position.

4. The installation as claimed in claim 1, wherein said trough comprises a bottom that is inclined relative to the horizontal when said bucket is in the filling position, this bottom comprising a washing orifice allowing a leakage flow rate markedly less than the filling flow rate of said cleaning fluid.

5. The installation as claimed in claim 1, comprising trap means interposed between said standing zone and said channel.

6. The installation as claimed in claim 1, wherein said cleaning fluid originates at least partly from the recycling of the wastes flushed from said zone.

* * * * *